United States Patent [19]

Bayliss

[11] 4,033,435
[45] July 5, 1977

[54] RETAINER MECHANISM FOR VEHICLE BRAKE ACTUATORS

[75] Inventor: John Patrick Bayliss, Redditch, England

[73] Assignee: Girling Limited, Birmingham, England

[22] Filed: Sept. 30, 1975

[21] Appl. No.: 618,227

[30] Foreign Application Priority Data

Oct. 16, 1974   United Kingdom ............ 44744/74

[52] U.S. Cl. .............................................. 188/173
[51] Int. Cl.² .......................................... B60T 13/04
[58] Field of Search ................... 188/171, 173, 167; 192/90

[56] References Cited

UNITED STATES PATENTS

| 2,410,183 | 10/1946 | Ray .................................... 188/171 |
| 3,095,068 | 6/1963 | Hansen ............................... 188/171 |
| 3,172,515 | 3/1965 | Wrensch .............................. 192/90 |
| 3,217,843 | 11/1965 | Newell et al. ....................... 188/173 |
| 3,400,797 | 9/1968 | Horn et al. ........................ 192/90 X |
| 3,525,424 | 8/1970 | McCarthy ........................... 188/171 |
| 3,698,520 | 10/1972 | McClure ............................. 188/171 |

Primary Examiner—Trygve M. Blix
Assistant Examiner—Douglas C. Butler
Attorney, Agent, or Firm—Scrivener, Parker, Scrivener & Clarke

[57] ABSTRACT

In a brake actuator an electric motor is operable when energized to hold a resilient brake applying assembly in a retracted energy-storing position and to retain the assembly in the retracted position.

5 Claims, 1 Drawing Figure

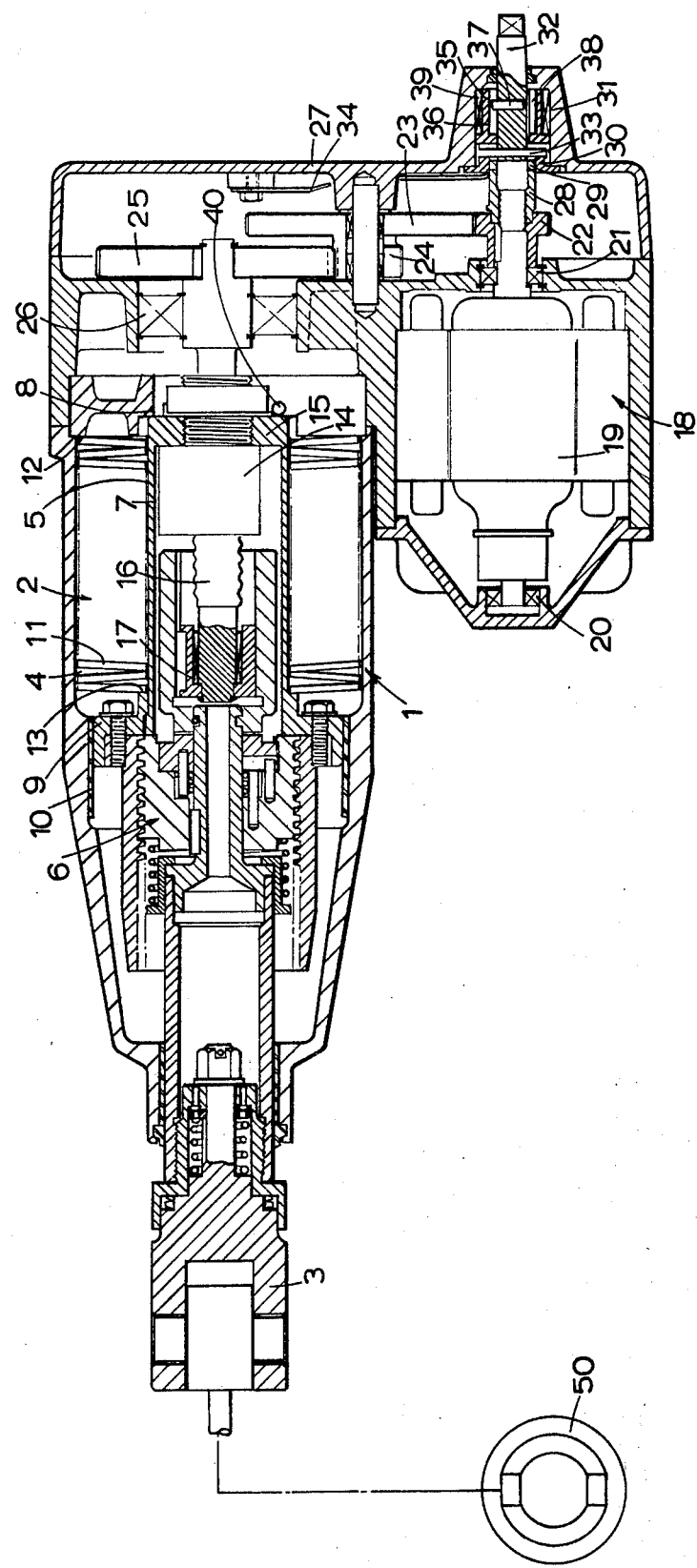

RETAINER MECHANISM FOR VEHICLE BRAKE ACTUATORS

This invention relates to brake actuators for vehicles of the kind in which pre-load resilient means act on a brake applying mechanism to apply a brake and, in a inoperative brakes off position, the pre-load resilient means are held in a retracted compressed energy-storing position by retainer means which are operative to release the resilient means when the brake is to be applied.

In known brake actuators of the kind set forth retainer means comprises a fluid-pressure operable piston and cylinder assembly which is pressurised to hold the pre-load resilient means in the retracted position and the pressure, either pneumatic or hydraulic, is relieved or otherwise reduced to release the resilient means when the brake is to be applied.

According to our present invention in a brake actuator of the kind set forth the retainer means comprises an electric motor operable when energised both to urge the resilient means into the retracted energy-storing position and to retain same in the said retracted position.

When the motor is running to urge the resilient means towards the retracted position the motor produces a back e.m.f. and the operating voltage has both to run the motor and to overcome the back e.m.f.

Control means are operable automatically to reduce the operational voltage applied to the motor when the resilient means attains the said retracted position so that the motor is stopped and is continuously stalled on a reduced holding voltage sufficient to maintain the same torque.

The holding voltage is less than the operational voltage since it no longer has to overcome a back e.m.f.

Conveniently the electric motor acts on the resilient means through a reduction gearing arrangement and a retractable carrier, rotation of the gearing being adapted to impart axial movement to the carrier through a rotatable threaded spindle and a nut with which the spindle engages threadably and which is coupled to the carrier against relative rotation.

A retracted position for the carrier is defined by the engagement of the carrier with an abutment to define a stop and when the carrier engages with the abutment, a micro-switch is operated to cause the reduced holding voltage to be applied to the motor.

Preferably re-wind means are incorporated for releasing the brake actuators in the event of failure of the electric power supply. Such re-wind means comprise a shaft for winding the threaded spindle inwardly through the gearing, and clutch means for retaining the shaft in the re-wound position.

A spring-operated brake assembly incorporating an automatic adjuster is illustrated in the single FIGURE of the accompanying drawings which is a longitudinal section through the assembly.

The spring-operated brake assembly illustrated in the drawing comprises a housing 1 in which is located a spring-loaded mechanism 2 for applying a brake applying force to a clevis 3 for connection to a brake applying mechanism (50). The spring-loaded mechanism comprises a spring-assembly 4 housed within a spring carrier 5 which acts on the clevis 3 through an automatic slack adjuster 6 which is constructed and arranged to maintain a constant clearance between friction pads and rotatable braking surfaces and to cater for stiffness and deflections of linkages of the brake applying mechanism. The slack adjuster 6 may be as described in our co-pending U.S. patent application Ser. No. 618,226 of even date. The spring carrier 5 comprises a central longitudinally extending hub 7 for engagement at one end with a fixed abutment or backstop 8 in the housing 1 and at the opposite end a radial flange 9 which is keyed for axial sliding movement with respect to the housing on splines 10. The spring assembly 4 comprises a plurality of disc-type springs or Belleville washers 11 which surround the hub 7 and abut at opposite ends between a stationary backstop 8 and a radial shoulder 13 at the intersection of the hub 7 with the flange 9.

The hub 7 accommodates a ball nut 14 which is keyed to it against relative rotation and abuts against an inwardly directed radial flange 15 at the end of the hub 7 which is opposite the flange 9. The nut 14 is threadably engaged with an axially fixed ball screw spindle 16 which is journalled at its inner end in a bearing 17 projects at its outer end through the flange 15.

An electric motor of the continuously rated type 18 for controlling operation of the spring-loaded mechanism 2 is spaced radially from the spindle 16. The armature 19 is journalled at opposite ends in bearings 20 and 21 and a portion projecting from the bearing 21 carries a pinion 22 which meshes with an idler pinion 23. The idler pinion 23 is integral with a pinion 24 of smaller diameter which meshes with a pinion 25 on an outer end portion of the spindle 16 outwardly of a bearing 26 in which that portion of the spindle 16 is journalled.

The pinions 22 to 25 are enclosed between the housing 1 and a detachable end plate 27, and the free end of the armature 19 carries a coupling 28 provided in its outer end with a pair of diametrically opposed notches 29. That end of the coupling 28 is journalled within a radially flanged drive sleeve 30 of top-hat outline which projects into a cylindrical recess 31 in the end plate 27. A drive shaft 32 projecting through the end plate 27 is coupled at its inner end to the sleeve 30 by means of a diametrical pin 33 which is normally spaced from the adjacent outer end of the coupling 28, being urged in that direction by a blade spring 34 which acts on the sleeve 30 to urge the flange on the drive sleeve 30 into engagement with the end plate 27.

The drive shaft 32 projects through a clutch mounting 35 of which a major portion 36 is of a diameter substantially greater than the shaft to define a substantial clearance therebetween. The drive shaft 32 carries a radial drive pin 37 which is rotatable within the mounting through substantially a complete turn between diametrically opposed faces of an eccentrically mounted axially extending pin 38 carried by the mounting 35 and through which the shaft 32 can impart a drive to the mounting 35.

A one-way roller clutch 39 is housed within the clutch mounting 35 and allows rotation of the clutch mounting 35 with respect to the end plate 27 only in one direction.

In an inoperative or brake "off" position as illustrated in the drawing the spring-assembly 4 is held in compressed or "energy-stored" position by the electric motor 18. This is achieved by applying to the motor 18 an operational voltage to energise the electric motor 18 to cause it to rotate the spindle 16 through the pinions which comprise a reduction gear mechanism. Since the ball nut 14 is held against rotation, the spring carrier 5 is moved towards the end plate 27, compressing the spring assembly 4 until the outer end of the carrier 5 engaged with the abutment face 8 to define a stop. At that point a micro-switch 40 is operated to cause a reduced holding voltage to be applied to the motor 18 sufficient to maintain the spring assembly 4 in the compressed condition but with the motor stopped. In the compressed position therefore the electric motor is continuously stalled on the reduced voltage.

When the motor 18 is running in response to the operational voltage a back e.m.f. is produced which also has to be overcome by the operational voltage. When the spring assembly attains a point defined by the engagement of the carrier 5 with the abutment face 8 at which it is fully compressed, the reduced holding voltage no longer has to overcome a back e.m.f, and its value is chosen only so that the motor 18 can maintain the same torque.

When it is desired to apply the brakes the voltage to the motor 18 is reduced to a value less than that of the holding voltage thereby allowing the stored energy in the spring assembly to be released with the assembly extending to transmit a brake-applying force to the clevis 3 through the spring carrier 5 and the adjuster 6. During axial movement of the spring carrier 5, the motor 18 is driven in the opposite direction through the reduction gear mechanism.

When the brakes are to be released the electric motor 18 is energised as described above.

In the event of an electrical power failure the brake can be released by the operation of a manual release mechanism comprising the shaft 32, the drive sleeve 30, and the coupling 28. This is achieved by urging the shaft 32 axially to cause the pin 33 to engage within the notches 29, urging the sleeve 30 inwardly against the force in the blade spring 34. Thereafter the shaft 32 can be rotated manually to rotate the spindle 16 through the pinions and compress the spring-assembly 4 until the spring carrier 5 has again engaged with the abutment face 8. Rotation of the shaft 32 is accompanied by rotation of the clutch mounting 35 due to the engagement of the drive pin 37 with the pin 38 and the one-way roller clutch 39 is operative to prevent accidental rotation of the spindle 16 and the shaft 32 in the opposite direction, beyond an extent allowed by the engagement of the drive pin 37 with the opposite side of the pin 38. Thus the normal release mechanism remains in an engaged position to hold the spring-assembly 4 compressed when the brakes are released manually, although the spring loading acts to rotate the shaft in the opposite direction through a limited distance until the pin 37 re-engages with the pin 38 as described above.

When the electrical power failure is rectified energisation of the motor initially causes the coupling 28 to rotate taking the loading from the drive sleeve 30 so that the pin 33 is thrown out of its engagement in the notches 29 by the loading in the blade spring 34. Thereafter, the spring assembly 4 is held in the compressed energy-stored condition as described above.

Our invention is particularly suitable for use with electrically driven vehicles, for example, electrically driven trams, where a source of power is always available.

I claim:

1. In a brake actuator for a vehicle comprising a brake applying mechanism for applying a brake, pre-load resilient means acting on said mechanism to apply said brake, a retractable carrier on which said resilient means is mounted, a nut coupled to said carrier, means preventing relative rotation of said nut and said carrier, a threaded spindle engaging threadably with said nut, and retainer means for holding said pre-load resilient means in a retracted compressed energy-storing position when the brake is in an off position and releasable to release said resilient means when the brake is to be applied, said retainer means comprises an electric motor operable in response to an operational voltage to urge said resilient means into said retracted energy-storing position and to retain said resilient means in the said retracted position, and a reduction gearing arrangement, said spindle being coupled to said gearing arrangement, and said electric motor acting on said spindle through said gearing arrangement whereby rotation of said spindle acts through said nut to impart axial movement to said carrier.

2. A brake actuator as claimed in claim 1, wherein control means are operable automatically to reduce said operational voltage applied to said motor to a reduced holding voltage when said resilient means attains the said retracted position whereby said motor is stopped and is continuously stalled on said reduced holding voltage.

3. A brake actuator as claimed in claim 2, wherein an abutment engageable by said carrier forms a stop defining a retracted position for said carrier to hold said resilient means in said retracted energy-storing position, and a micro-switch operable to cause said reduced holding voltage to be applied to said motor is actuated when said carrier engages with said abutment.

4. A brake actuator as claimed in claim 1, wherein re-wind means are incorporated for releasing said brake actuator in the event of failure of said voltage.

5. In a brake actuator for a vehicle comprising a brake applying mechanism for applying a brake, pre-load resilient means acting on said mechanism to apply said brake, a retractable carrier on which said resilient means is mounted, a nut coupled to said carrier, means preventing relative rotation of said nut and said carrier, a threaded spindle engaging threadably with said nut, and retainer means for holding said pre-load resilient means in a retracted compressed energy-storing position when the brake is in an off position and releasable to release said resilient means when the brake is to be applied, said retainer means comprises an electric motor operable in response to an operational voltage to urge said resilient means into said retracted energy-storing position and to retain said resilient means in the said retracted position, and a reduction gearing arrangement, said spindle being coupled to said gearing arrangement, and said electric motor acting on said spindle through said gearing arrangement whereby rotation of said spindle acts through said nut to impart axial movement to said carrier re-wind means being incorporated for releasing said brake actuator in the event of failure of said voltage, said re-wind means comprising a shaft for winding the threaded spindle inwardly through said gearing and rotatable into a re-wound position, and clutch means for retaining said shaft in said re-wound position.

* * * * *